United States Patent
Hsu et al.

(10) Patent No.: US 9,531,428 B2
(45) Date of Patent: Dec. 27, 2016

(54) WIRELESS COMMUNICATION CALIBRATION SYSTEM AND ASSOCIATED METHOD

(71) Applicant: MEDIATEK INC., Hsin-Chu (TW)

(72) Inventors: Tsai-Yuan Hsu, Hsinchu County (TW); Yu-Ching Liu, New Taipei (TW); Jian-Hsiung Liao, Hsinchu County (TW); Tzu-Wei Han, New Taipei (TW); Yi-Chun Chou, Hsinchu County (TW); Yen-Wen Yang, Hsinchu (TW); Sheng-Yao Chen, Taoyuan (TW); Shun-Yong Huang, Hsinchu (TW); Po-Jung Chiu, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/930,675

(22) Filed: Nov. 3, 2015

(65) Prior Publication Data

US 2016/0261303 A1 Sep. 8, 2016

Related U.S. Application Data

(60) Provisional application No. 62/127,356, filed on Mar. 3, 2015.

(51) Int. Cl.
| | |
|---|---|
| *H04B 1/48* | (2006.01) |
| *H04B 1/44* | (2006.01) |
| *H04B 17/21* | (2015.01) |
| *H04B 17/11* | (2015.01) |
| *H04B 1/3816* | (2015.01) |

(52) U.S. Cl.
CPC .............. *H04B 1/44* (2013.01); *H04B 1/3816* (2013.01); *H04B 17/11* (2015.01); *H04B 17/21* (2015.01)

(58) Field of Classification Search
CPC .......... H04B 1/44; H04B 17/21; H04B 17/11; H04B 1/3816; H04B 1/48
USPC .................................... 455/78; 370/278, 282
See application file for complete search history.

(56) References Cited

U.S. PATENT DOCUMENTS

| | | | | |
|---|---|---|---|---|
| 4,682,112 | A * | 7/1987 | Beer .................... | G01R 33/341 324/312 |
| 4,916,448 | A * | 4/1990 | Thor ....................... | G01S 13/94 340/963 |
| 5,732,333 | A * | 3/1998 | Cox ........................ | H03C 3/406 330/149 |
| 5,889,491 | A * | 3/1999 | Minter ................. | G01S 13/9303 342/174 |
| 5,920,281 | A * | 7/1999 | Grace ................... | G01S 7/4052 342/165 |
| 5,973,643 | A * | 10/1999 | Hawkes ................. | G01S 1/045 342/457 |

(Continued)

*Primary Examiner* — Hai V Nguyen
(74) *Attorney, Agent, or Firm* — Winston Hsu; Scott Margo (57) ABSTRACT

A wireless communication calibration system has a radio chipset, an analog circuit set, and a calibration path. The radio chipset has a transmitter and a receiver. The analog circuit set is external to the radio chipset and coupled to the transmitter, and receives an output signal of the transmitter and generates a transmission signal according to the output signal. The calibration path is external to the radio chipset and coupled to the analog circuit set, and guides an input signal to the receiver, wherein the input signal is derived from the transmission signal, and a first delay is calculated after the input signal is received by the receiver.

20 Claims, 7 Drawing Sheets

(56) References Cited

U.S. PATENT DOCUMENTS

| | | | | |
|---|---|---|---|---|
| 6,385,441 B1* | 5/2002 | Takakusaki | H01Q 3/267 | 455/226.1 |
| 6,529,844 B1* | 3/2003 | Kapetanic | G01R 23/20 | 324/601 |
| 6,570,462 B2* | 5/2003 | Edmonson | H03H 7/40 | 333/150 |
| 6,708,020 B1* | 3/2004 | Hiramatsu | H04L 1/24 | 342/173 |
| 6,804,497 B2* | 10/2004 | Kerth | H04B 1/0003 | 455/114.2 |
| 7,212,587 B2* | 5/2007 | Khlat | H03F 1/304 | 375/319 |
| 7,450,907 B2* | 11/2008 | Shurvinton | H03G 3/3047 | 370/328 |
| 7,500,123 B2* | 3/2009 | Luong | G06F 1/3203 | 713/320 |
| 7,508,898 B2* | 3/2009 | Cyr | H01L 24/06 | 375/375 |
| 7,702,287 B2* | 4/2010 | Kitahara | H01Q 3/267 | 370/208 |
| 7,764,935 B2* | 7/2010 | Pallonen | H03F 3/211 | 455/115.1 |
| 8,085,108 B2* | 12/2011 | Philippe | H03C 5/00 | 332/145 |
| 8,154,330 B2* | 4/2012 | Kao | H03K 21/023 | 327/161 |
| 8,299,572 B2* | 10/2012 | Reisner | H01L 23/481 | 257/531 |
| 8,462,881 B2* | 6/2013 | Neumann | H04L 27/368 | 375/295 |
| 8,948,236 B2* | 2/2015 | Mukai | G01S 13/767 | 375/220 |
| 8,971,941 B2* | 3/2015 | Park | H04B 1/0458 | 370/310 |
| 9,065,537 B2* | 6/2015 | Georgantas | H04B 1/30 | |
| 9,281,851 B2* | 3/2016 | Axholt | | |
| 9,312,929 B2* | 4/2016 | Forenza | H04B 7/024 | |
| 9,383,441 B2* | 7/2016 | Younis | G01S 13/753 | |
| 9,386,465 B2* | 7/2016 | Forenza | H04B 7/0626 | |
| 9,425,742 B2* | 8/2016 | Langer | H03F 1/0222 | |
| 2002/0144195 A1* | 10/2002 | Ramanathan | G01R 31/31937 | 714/55 |
| 2003/0119456 A1* | 6/2003 | Maligeorgos | H03B 27/00 | 455/87 |
| 2003/0186725 A1* | 10/2003 | Miya | H01Q 3/267 | 455/561 |
| 2004/0038649 A1* | 2/2004 | Lin | H04B 1/30 | 455/130 |
| 2004/0161064 A1* | 8/2004 | Brethour | H04B 1/71637 | 375/347 |
| 2005/0107059 A1* | 5/2005 | Lehning | H04L 27/00 | 455/303 |
| 2005/0228268 A1* | 10/2005 | Cole | A61B 5/1112 | 600/420 |
| 2005/0289377 A1* | 12/2005 | Luong | G06F 1/3203 | 713/322 |
| 2006/0030277 A1* | 2/2006 | Cyr | H01L 24/06 | 455/77 |
| 2006/0061469 A1* | 3/2006 | Jaeger | B60R 25/00 | 340/539.13 |
| 2007/0225042 A1* | 9/2007 | Kitahara | H01Q 3/267 | 455/562.1 |
| 2008/0039708 A1* | 2/2008 | Taicher | A61B 5/055 | 600/410 |
| 2008/0185903 A1* | 8/2008 | Bausov | E21C 27/24 | 299/1.2 |
| 2008/0218400 A1* | 9/2008 | Stolarczyk | E21C 35/24 | 342/22 |
| 2008/0315356 A1* | 12/2008 | Reisner | H01L 23/481 | 257/531 |
| 2010/0019924 A1* | 1/2010 | D'Alessandro | G01S 5/0289 | 340/8.1 |
| 2010/0111227 A1* | 5/2010 | Philippe | H03C 5/00 | 375/300 |
| 2010/0164753 A1* | 7/2010 | Free | G08G 1/096783 | 340/932 |
| 2010/0166110 A1* | 7/2010 | Neumann | H04L 27/368 | 375/296 |
| 2011/0001652 A1* | 1/2011 | Martino | G01S 7/40 | 342/14 |
| 2011/0045786 A1* | 2/2011 | Leinonen | H01Q 3/24 | 455/78 |
| 2011/0142174 A1* | 6/2011 | Park | H04B 1/7183 | 375/340 |
| 2011/0183628 A1* | 7/2011 | Baker | H03L 7/181 | 455/67.14 |
| 2011/0288860 A1* | 11/2011 | Schevciw | G10L 25/78 | 704/233 |
| 2012/0044974 A1* | 2/2012 | Mukai | G01S 13/767 | 375/141 |
| 2012/0192617 A1* | 8/2012 | Walton | G01N 29/022 | 73/23.2 |
| 2012/0299651 A1* | 11/2012 | Goel | H03F 3/45188 | 330/185 |
| 2012/0327744 A1* | 12/2012 | Lemoult | B82Y 20/00 | 367/99 |
| 2014/0225763 A1* | 8/2014 | Kavaler | G08G 1/142 | 342/70 |
| 2014/0240170 A1* | 8/2014 | Rudow | G01S 19/04 | 342/357.42 |
| 2015/0063175 A1* | 3/2015 | Yoshihara | H04B 15/04 | 370/278 |
| 2015/0124713 A1* | 5/2015 | Salhov | H01Q 3/2605 | 370/329 |
| 2016/0054440 A1* | 2/2016 | Younis | G01S 13/753 | 342/5 |
| 2016/0094331 A1* | 3/2016 | White | H04B 1/525 | 370/278 |
| 2016/0142077 A1* | 5/2016 | Jeong | H04B 1/0057 | 370/297 |
| 2016/0149652 A1* | 5/2016 | Huang | H04B 17/14 | 375/221 |
| 2016/0173030 A1* | 6/2016 | Langer | H03F 1/0222 | 330/291 |
| 2016/0209495 A1* | 7/2016 | Hsu | H04W 4/023 | |

* cited by examiner

WIRELESS COMMUNICATION CALIBRATION SYSTEM AND ASSOCIATED METHOD

CROSS REFERENCE TO RELATED APPLICATIONS

This application claims the benefit of U.S. Provisional Application No. 62/127,356 filed on Mar. 3, 2015, the contents of which are incorporated herein by reference.

BACKGROUND

The present invention relates to a wireless communication calibration system, and more particularly, to a calibration system that measures a delay outside chipset for calibration, and an associated method.

The performance of various radio features, such as the timing accuracy of packets at an antenna port in the 802.11 v/mc standard or the phase delay at multiple antenna ports for beam-form support in the 802.11 standard, is affected by the accuracy of a measured circuit delay to a resolution of nanoseconds. Delay of analog circuits outside the chipset, such as a Film Bulk Acoustic Resonator (FBAR) filter or Bulk Acoustic Wave (BAW) filter, may have a variation of tens of nanoseconds among chip samples, or as a result of operation frequency or changes in temperature. Therefore, the estimation of circuit delay on both the transmitter and receiver path, including both digital and analog circuits inside and outside the chip, to a resolution of nanoseconds in order to calculate or control timing of packets transmitted or received at the antenna port is a problem which needs to be solved. Conventional methods for calibrating circuit delay such as using a look-up table requires large memory resources, as a calibration table with various dimensions such as temperature, frequency and component vendors needs to be stored. This also consumes time for applying offline calibration. In addition, employing a calibration loop inside the chipset cannot compensate for the circuit delay outside the chipset.

SUMMARY

One of the objectives of the present invention is therefore to provide a calibration system that can measure a delay outside a chipset for calibration, and an associated method.

According to an embodiment of the present invention, a wireless communication calibration system is disclosed. The calibration system includes a radio chipset, an analog circuit set, and a calibration path. The radio chipset has a transmitter and a receiver. The analog circuit set is external to the radio chipset and coupled to the transmitter, and is arranged to receive an output signal of the transmitter and generate a transmission signal according to the output signal. The calibration path is external to the radio chipset and coupled to the analog circuit set, and is arranged to guide an input signal to the receiver, wherein the input signal is derived from the transmission signal, and a first delay is calculated after the input signal is received by the receiver.

According to another embodiment of the present invention, a wireless communication calibration system is disclosed. The calibration system includes a radio chipset, an analog circuit set, and a switch set. The radio chipset has a transmitter and a receiver. The analog circuit set is external to the radio chipset, and has a plurality of analog circuits. The switch set is external to the radio chipset. The switch set is coupled to the analog circuit set and arranged to selectively bypass at least one analog circuit of the plurality of analog circuits. A transmission signal is generated from an output signal of the transmitter transmitted via the analog circuit set and the switch set, an input signal of the receiver is generated from a reception signal transmitted via the analog circuit set and the switch set, the reception signal is derived from the transmission signal, and a first delay is calculated after the input signal is received by the receiver.

According to an embodiment of the present invention, a wireless communication calibration method is disclosed, wherein the method comprises: receiving an output signal of a transmitter in a radio chipset; generating a transmission signal external to the radio chipset according to the output signal; and guiding an input signal to a receiver in the radio chipset via a calibration path external to the radio chipset, wherein a first delay is calculated after the input signal is received by the receiver.

According to another embodiment of the present invention, a wireless communication calibration method is disclosed, wherein the method comprises: generating a transmission signal from an output signal of a transmitter transmitted via an analog circuit set and a switch set; generating an input signal of a receiver from a reception signal transmitted via the analog circuit set and the switch set, wherein the reception signal is derived from the transmission signal, and the transmitter and the receiver are in a radio chipset, and the switch set and the analog circuit set are external to the radio chipset; and utilizing the switch set to selectively bypass at least one analog circuit of the analog circuit set; wherein a first delay is calculated after the input signal is received by the receiver.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
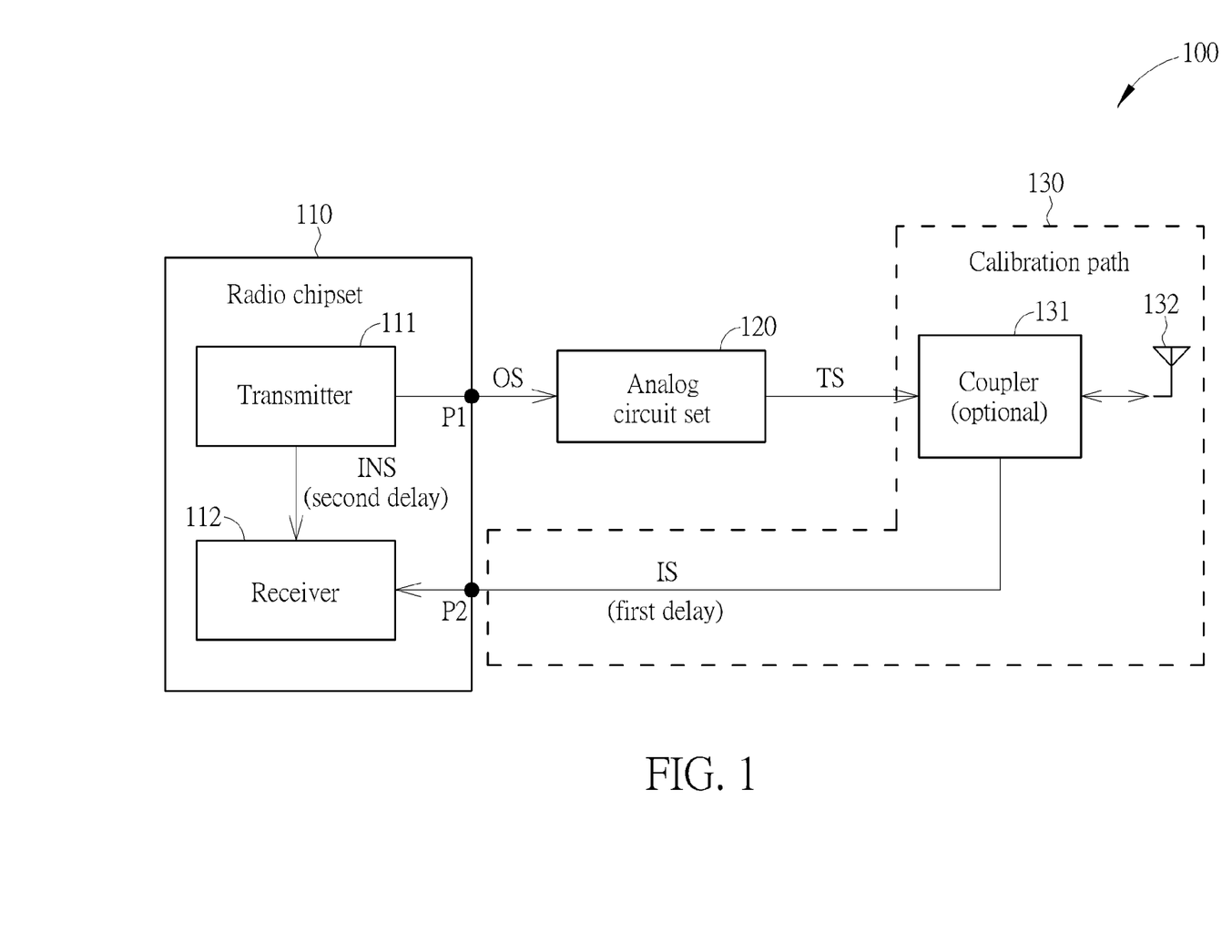
FIG. 1 is a diagram illustrating a wireless communication calibration system according to an embodiment of the present invention.

FIG. 1 is a diagram illustrating a wireless communication calibration system 100 according to an embodiment of the present invention. In this embodiment, the calibration system 100 comprises a radio chipset 110, an analog circuit set 120 and a calibration path 130. As shown in FIG. 1, the analog circuit set 120 and the calibration path 130 are both external to the radio chipset 110. The radio chipset 100 may be a transceiver having a transmitter 111 and a receiver 112, wherein the transmitter 111 is arranged to transmit an output signal OS to the external analog circuit set 120, and the receiver 112 is arranged to receive an input signal IS from the external calibration path 130 and an internal signal INS from the transmitter 111.

Figure 2:
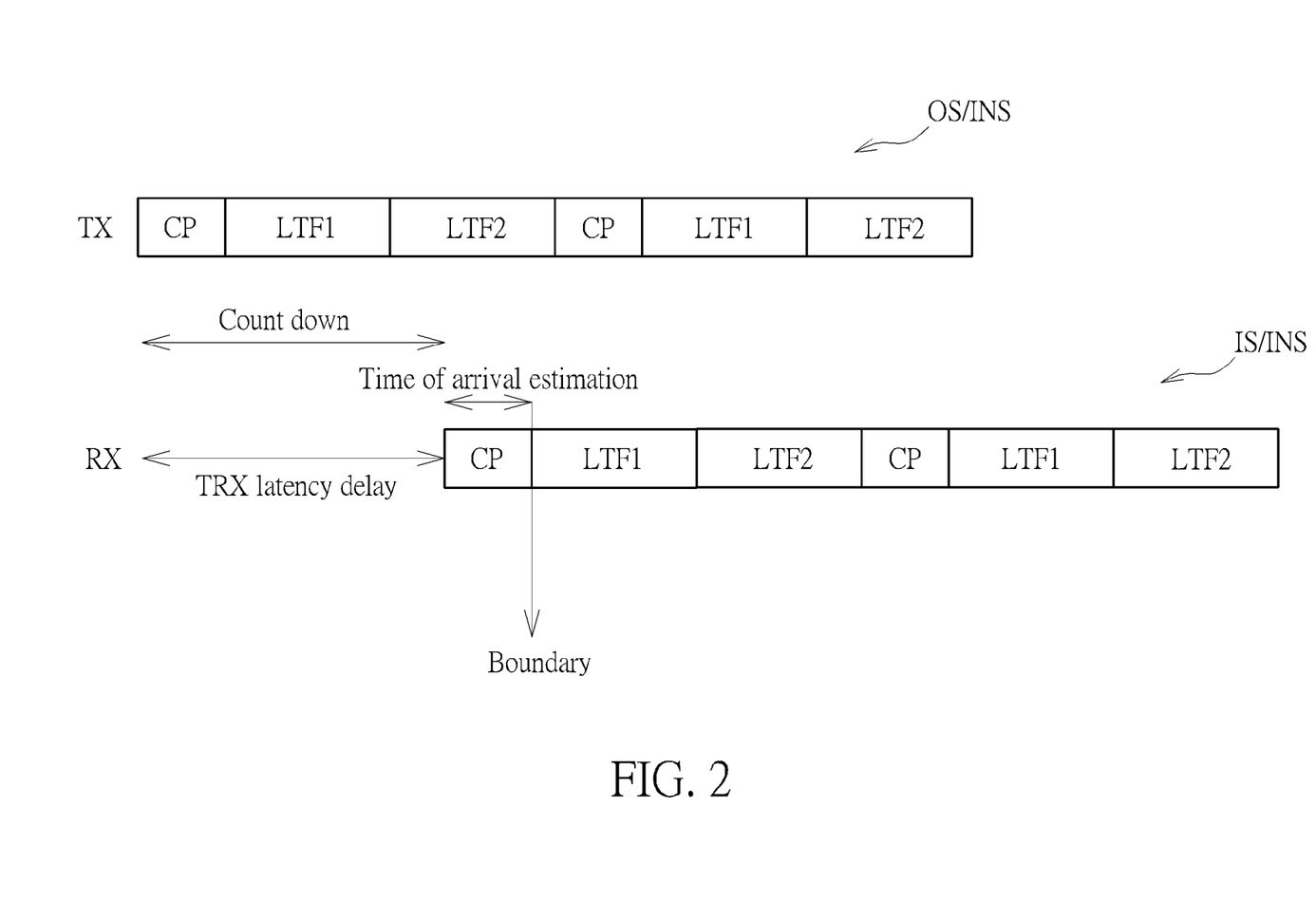
FIG. 2 is a diagram illustrating a calibration pattern according to an embodiment of the present invention.

The output signal OS and the internal signal INS transmitted from the transmitter 111 comprise a calibration pattern for calculating a first delay and a second delay, respectively. FIG. 2 is a diagram illustrating a calibration pattern according to an embodiment of the present invention. As shown in FIG. 2, the output signal OS and the internal signal INS transmitted from the transmitter (TX) comprises a repeated pattern such as Cyclic prefix (CP), Long Training Field 1 (LTF1) and Long Training Field 2 (LTF2). When the output signal OS/the internal signal INS leaves the transmitter 111, a digital circuit (not shown in FIG. 1) in the radio chipset 110 starts to count down a predetermined time period, wherein the predetermined time period is a rough estimation for the travel time of the output signal OS/the internal signal INS travelling from the transmitter 111 to the receiver 112. When the predetermined time period expires, the receiver 112 starts to detect the boundary of the LTF1, as shown in FIG. 2. When the receiver 112 detects the boundary, the delay between the transmitter 111 and the receiver 112 is the predetermined time period plus the detecting time of the receiver 112 minus the duration of the CP. In this way, the first delay and the second delay can be calculated.

It should be noted that a conventional radio chipset can comprise a plurality of transmitter and receiver sets for different purposes, i.e. there may be a plurality of ports for transmitters and receivers in the same radio chipset, and each port is responsible for different functions. In this embodiment, the receiver 112 and the transmitter 111 belong to different ports P1 and P2, respectively, for calculating an outside radio chipset delay. The detailed description of the calibration flow will be discussed in the following paragraphs.

The analog circuit set 120 comprises a plurality of analog circuits (not shown in FIG. 1) such as an FBAR filter, a BAW filter, Balun or diplexer for processing the output signal OS to generate a transmission signal TS such as a radio-frequency (RF) signal. Those skilled in the art should understand the functions of these analog circuits in a wireless communication system. In addition, the present invention is focused on the calibration mechanism. Hence, the detailed description of these analog circuits is omitted here for brevity.

The calibration path 130 is arranged to guide the input signal IS to the receiver 112, wherein the input signal IS is derived from the transmission signal TS. In this embodiment, the calibration path 130 comprises a coupler 131 and an antenna 132. The coupler 131 is arranged to couple the transmission signal TS to the receiver 112, i.e. before the transmission signal TS is radiated via the antenna 132, the input signal IS at the feedback path between the coupler 131 and the receiver 112 can be induced from the transmission signal TS through the coupler 131. It should be noted that, in other embodiments, the calibration path 130 may only comprise the antenna 132, and the antenna 132 transmits the transmission signal TS to another antenna and receives a response signal from the other antenna to generate the input signal IS to the receiver 112. After the first delay and the second delay are calculated, the outside chipset delay will be the first delay minus the second delay.

Figure 3:
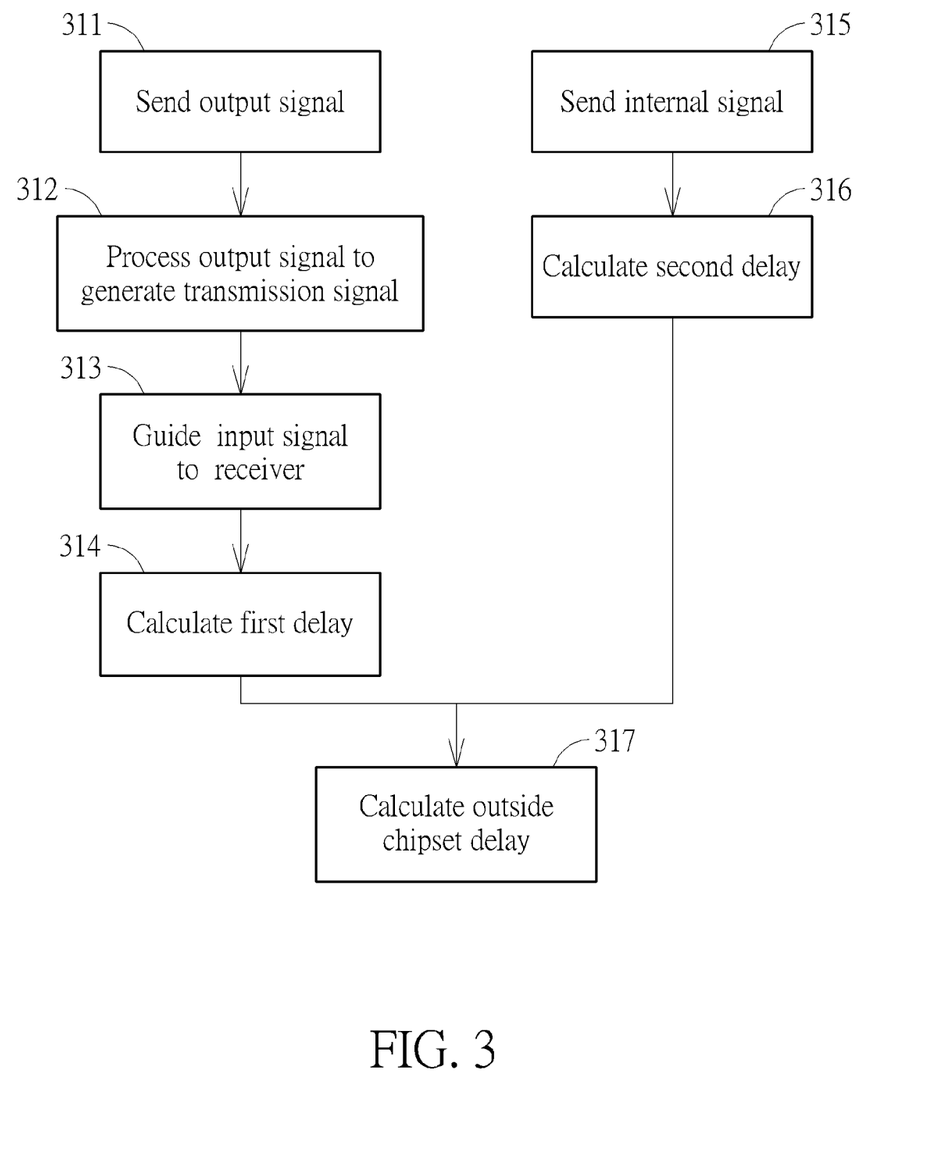
FIG. 3 is a flowchart illustrating a calibration flow according to the embodiment of FIG. 1.

FIG. 3 is a flowchart illustrating a calibration flow according to the embodiment of FIG. 1. Provided that the result is substantially the same, the steps are not required to be executed in the exact order shown in FIG. 3. In addition, one or more steps may be added to or removed from the calibration flow shown in FIG. 3. The calibration flow is described as follows.

Step 311: Send an output signal OS to the analog circuit set 120.

Step 312: Process the output signal OS to generate a transmission signal TS to the calibration path 130.

Step 313: Guide the input signal IS to the receiver 112, wherein the input signal IS is derived from the transmission signal TS.

Step 314: Calculate the first delay after the receiver 112 receives the input signal IS; go to step 317.

Step 315: Send the internal signal INS inside the radio chipset 110 to the receiver 112.

Step 316: Calculate the second delay after the receiver 112 receives the internal signal INS.

Step 317: Calculate the outside chipset delay according to the first delay and the second delay. For example, outside chipset delay=first delay−second delay.

As a person skilled in the pertinent art can readily understand details of the steps shown in FIG. 3 after reading the above paragraphs, further description is omitted here for brevity.

Conventionally, the radio chipset comprises two operating modes: transmitter (TX) mode and receiver (RX) mode. In these two operating modes, the equivalent impedance seen from the transmitter and the receiver will be slightly different, and the difference in impedance causes a circuit delay. Therefore, the outside chipset delay should be calculated when the radio chipset is operating in both the TX mode and the RX mode.

Figure 4:
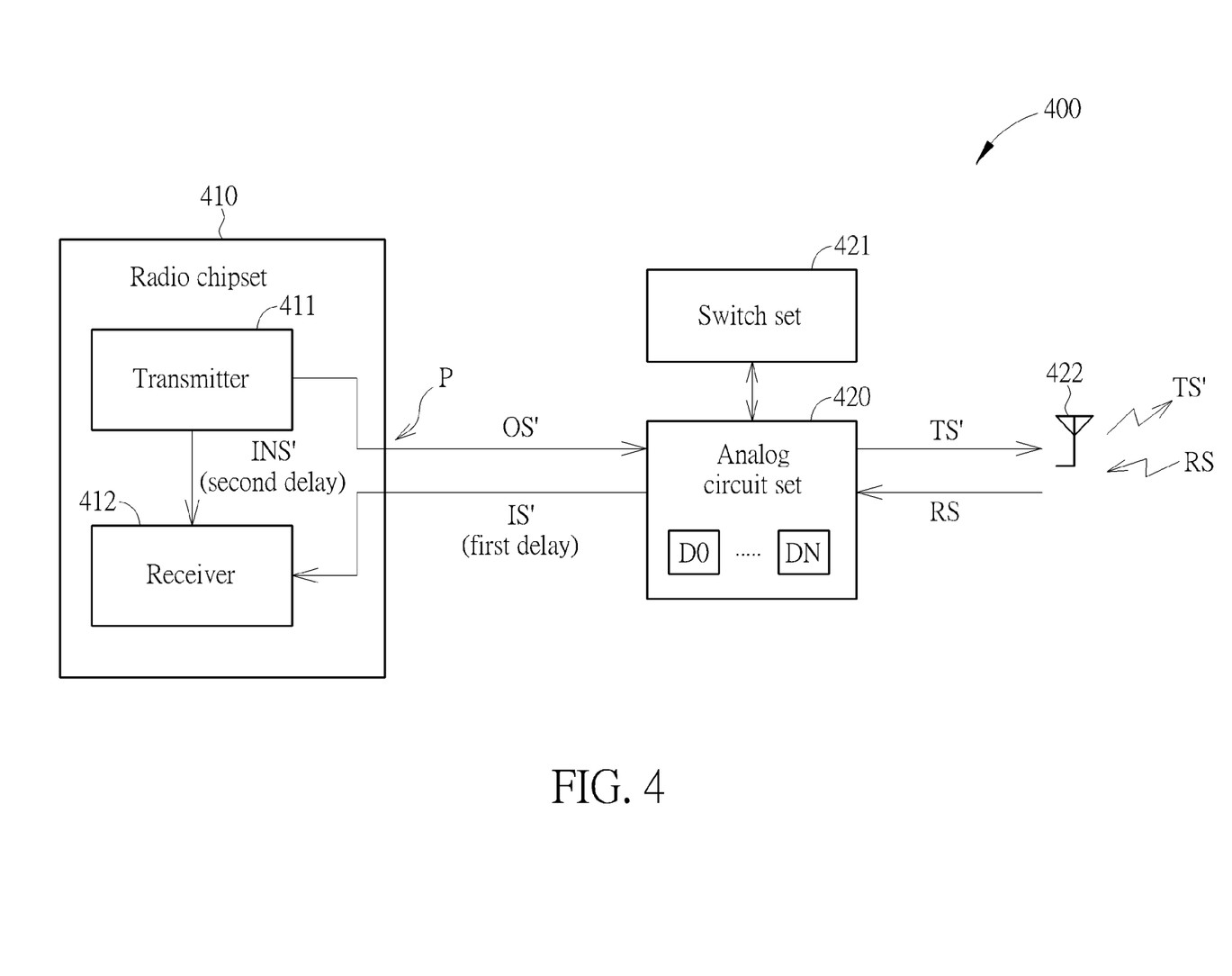
FIG. 4 is a diagram illustrating a wireless communication calibration system according to another embodiment of the present invention.

FIG. 4 is a diagram illustrating a calibration system 400 of wireless communication according to another embodiment of the present invention. In this embodiment, the calibration system 400 comprises a radio chipset 410, an analog circuit set 420, a switch set 421 and an antenna 422. As shown in FIG. 4, the analog circuit set 420, the switch set 420 and the antenna 422 are external to the radio chipset 410. The radio chipset 410 may be a transceiver comprising a transmitter 411 and a receiver 412, wherein the transmitter 411 is arranged to send an output signal OS' to the external analog circuit set 420, and the receiver 412 is arranged to receive an input signal IS' from the external analog circuit set 420 and an internal signal INS' from the transmitter 411. The analog circuit set 420 comprises a plurality of analog circuits $D_0$–$D_N$ (e.g. an FBAR filter, BAW filter, Balun, diplexer, etc.) for processing the output signal OS' to generate a transmission signal TS' as mentioned in the embodiment of FIG. 1. The switch set 421 is arranged to selectively bypass at least an analog circuit which has a variation in delay greater than a predetermined value. For example, the switch set 421 has one or more switches controlled to change the signal path configuration inside the analog circuit set 420.

Figure 5:
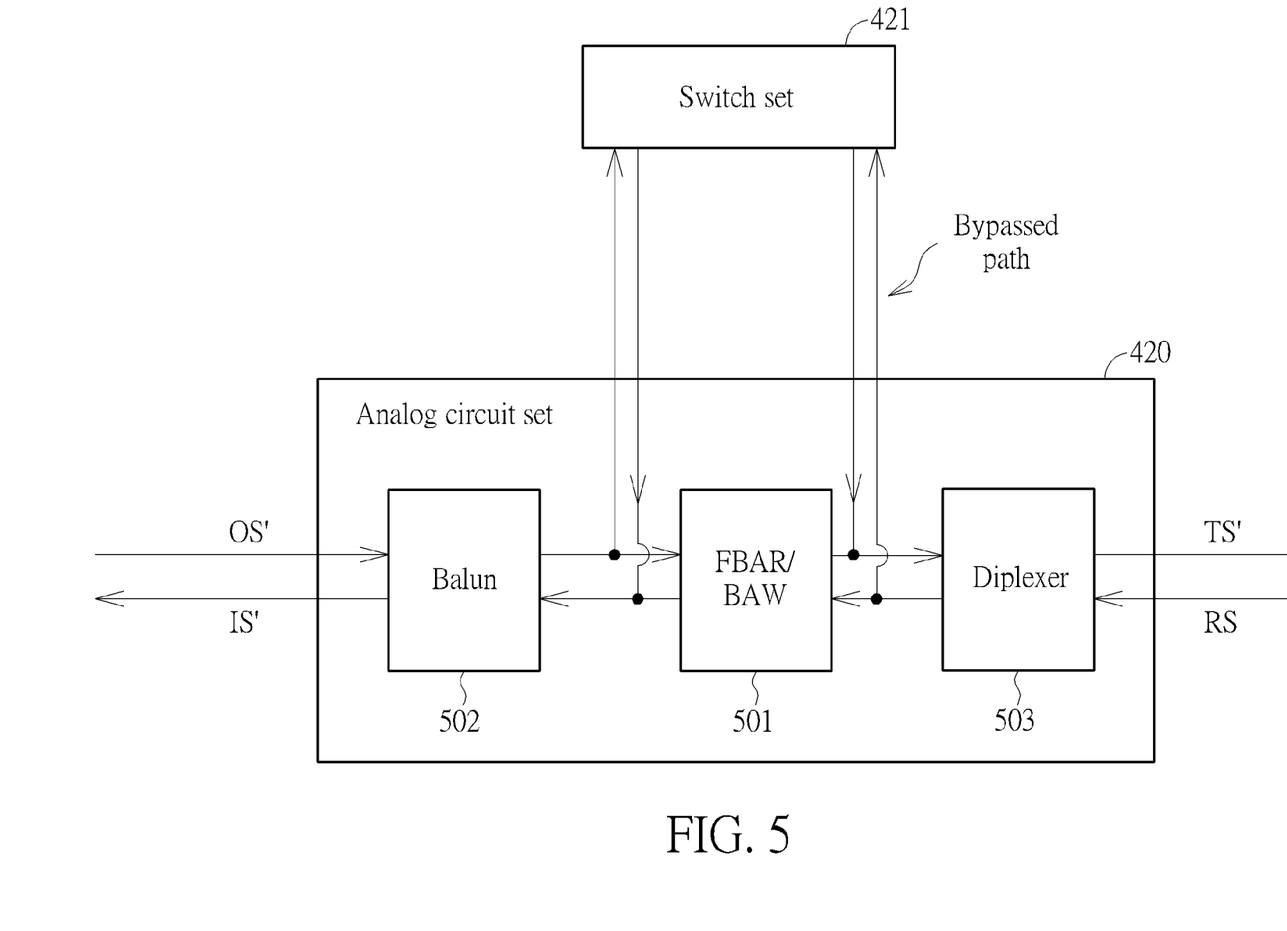
FIG. 5 is a diagram illustrating a switch set that bypasses at least an analog circuit of the analog circuit set according to the embodiment of FIG. 4.

FIG. 5 is a diagram illustrating the switch set 421 that bypasses at least an analog circuit of the analog circuit set 420 according to the embodiment of FIG. 4. As shown in FIG. 5, the analog circuit set 420 comprises analog circuits, including an FBAR/BAW filter 501, a Balun 502 and a diplexer 503, wherein the FBAR/BAW filter 501 in the analog circuit set 420 usually has a variation in delay greater than the predetermined value. Therefore, when the transmitter and the receiver require an accurate timing, the switch set 421 bypasses the FBAR/BAW filter in the analog circuit set 420 to generate a bypassed path. Incoming and outgoing signals thereby pass through the bypassed path for transmission and reception. Referring to FIG. 4 again, the antenna 422 receives the transmission signal TS' and transmits it to another antenna, and receives a reception signal RS from the other antenna to the analog circuit set 420. The analog circuit set 420 processes the reception signal RS to generate the input signal IS' to the receiver 412. More specifically, when accurate timing is desirable, the switch set 321 bypasses the FBAR/BAW filter 501 in the analog circuit set 420 to generate the bypassed path. The transmission signal TS' is thereby generated from the output signal OS' transmitted via the analog circuit set 420 and the switch set 421 through the bypassed path, and the input signal IS' is generated from the reception signal RS via the analog circuit set 420 and the switch set 421 through the bypassed path. It should be noted that, in this embodiment, the transmitter 411 and the receiver 412 share the same port P for calculating an outside chipset delay which is different from the embodiment of FIG. 1. It should also be noted that the method for calculating an outside chipset delay as illustrated in FIG. 2 may be employed by the embodiment shown in FIG. 4.

Figure 6:
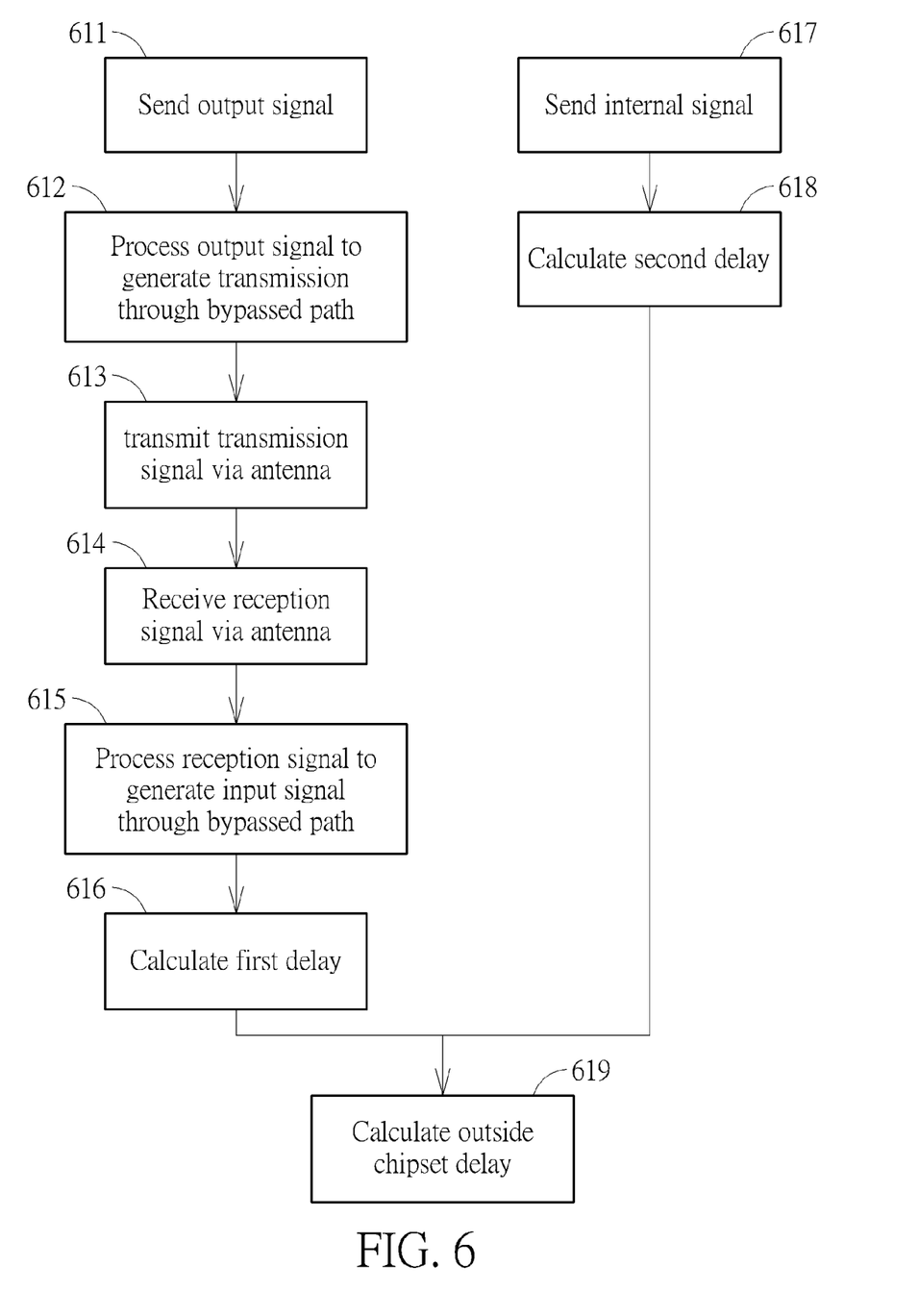
FIG. 6 is a flowchart illustrating a calibration flow according to the embodiment of FIG. 4.

FIG. 6 is a flowchart illustrating a calibration flow according to the embodiment of FIG. 4. Provided that the result is substantially the same, the steps are not required to be executed in the exact order shown in FIG. 6. In addition, one or more steps may be added to or removed from the calibration flow shown in FIG. 6. The calibration flow is described as follows:

Step 611: Send the output signal OS' from the transmitter 411 to the analog circuit set 420 for processing.

Step 612: Process the output signal OS' via the switch set 421 through the bypassed path to generate the transmission signal TS'.

Step 613: Send the transmission signal TS' via the antenna 422 to another antenna for communication.

Step 614: Receive the reception signal RS corresponding to the transmission signal TS' from the other antenna via the antenna 422.

Step 615: Process the reception signal RS via the switch set 421 through the bypassed path to generate the input signal IS' to the receiver 412.

Step 616: Calculate the first delay after the receiver 412 receives the input signal IS'; go to step 619.

Step 617: Send the internal signal INS' from the transmitter 411 to the receiver 412 inside the radio chipset 410.

Step 618: Calculate the second delay after the receiver 412 receives the internal signal INS'.

Step 619: Calculate the output chipset delay according to the first delay and the second delay. For example, output chipset delay=first delay−second delay.

Figure 7:
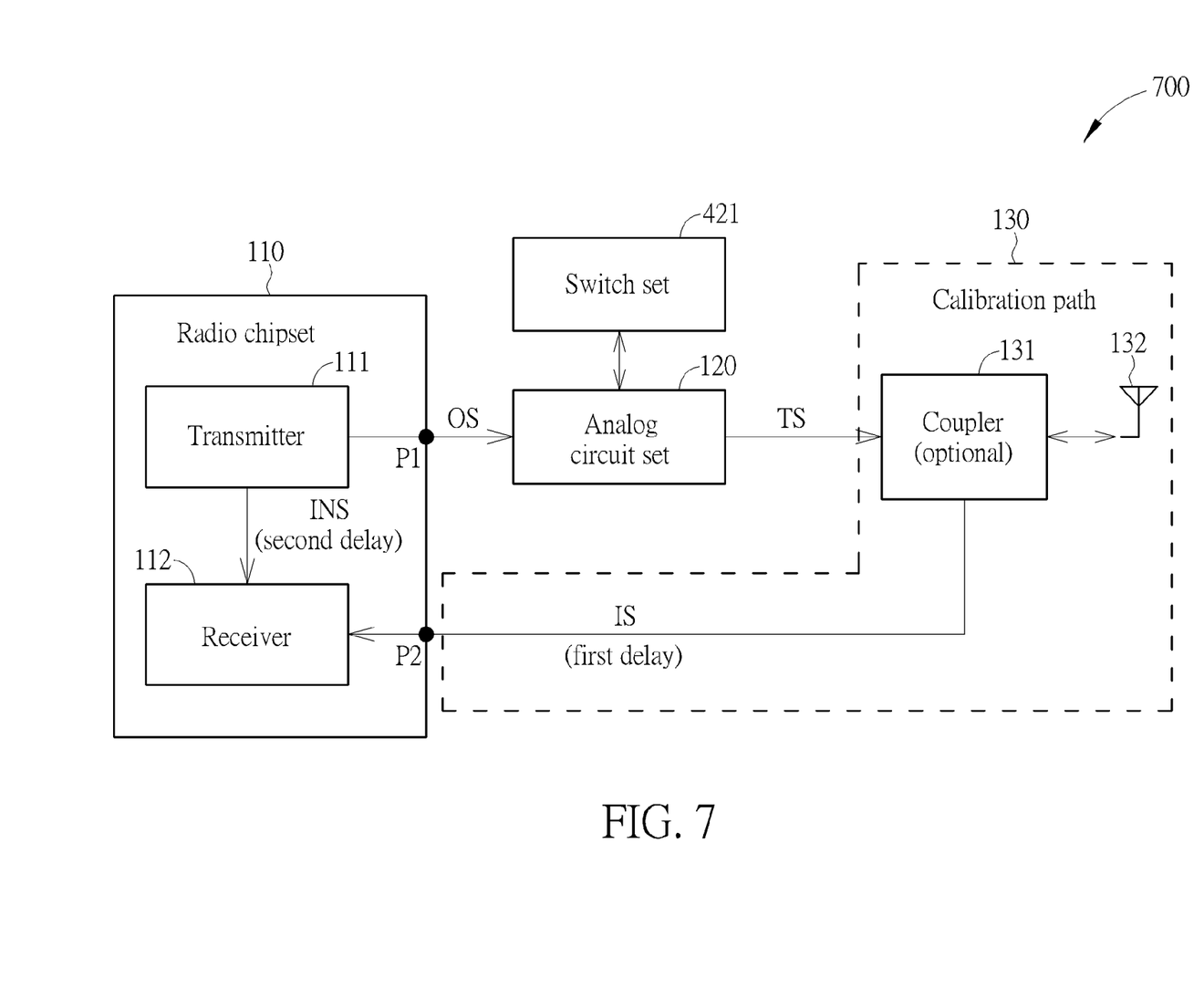
FIG. 7 is a diagram illustrating a wireless communication calibration system according to yet another embodiment of the present invention.

It should be noted that the switch set 421 does not have to bypass the analog circuit set 420 when accurate timing is not desirable. In this case, the output signal OS' and the reception signal RS are transmitted to the analog circuit set 420 for processing without passing through the switch set 421 and the bypassed path shown in FIG. 5. Furthermore, the switch set 421 can be applied to the system 100 in the embodiment of FIG. 1 for bypassing at least one analog circuit in the analog circuit set 120. FIG. 7 is a diagram illustrating a wireless communication calibration system according to yet another embodiment of the present invention. In this embodiment, the calibration system 700 includes the calibration system 110 and the switch set 421. The benefit of the embodiment shown in FIG. 4 is also achieved by the embodiment shown in FIG. 7. The person skilled in the art should understand how to implement these designs after reading the abovementioned paragraphs. The detailed description is thus omitted here for brevity. These alternative designs shall fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication calibration system, comprising:
    a radio chipset, comprising a transmitter and a receiver;
    an analog circuit set, external to the radio chipset and coupled to the transmitter, wherein the analog circuit set is arranged to receive an output signal of the transmitter and generate a transmission signal according to the output signal; and
    a calibration path, external to the radio chipset and coupled to the analog circuit set, wherein the calibration path is arranged to guide an input signal to the receiver, and the input signal is derived from the transmission signal;
    wherein a first delay is calculated after the input signal is received by the receiver.

2. The wireless communication calibration system of claim 1, wherein an internal signal is transmitted inside the radio chipset from the transmitter to the receiver, and a second delay is calculated after the internal signal is received by the receiver.

3. The wireless communication calibration system of claim 2, wherein an outside chipset delay is obtained according to the first delay and the second delay.

4. The wireless communication calibration system of claim 1, further comprising:
    a switch set, external to the radio chipset, wherein the switch set is coupled to the analog circuit set and arranged to selectively bypass at least one analog circuit of the analog circuit set;
    wherein the output signal of the transmitter is transmitted via the switch set and the analog circuit set.

5. The wireless communication calibration system of claim 4, wherein the switch set bypasses the analog circuit of the analog circuit set to generate a bypassed path, and the output signal is transmitted through the bypassed path.

6. The wireless communication calibration system of claim 1, wherein the calibration path comprises a coupler or an antenna.

7. A wireless communication calibration system, comprising:
    a radio chipset, comprising a transmitter and a receiver;

an analog circuit set, external to the radio chipset and comprising a plurality of analog circuits; and a switch set, external to the radio chipset, wherein the switch set is coupled to the analog circuit set and arranged to selectively bypass at least one analog circuit of the plurality of analog circuits;

wherein a transmission signal is generated from an output signal of the transmitter transmitted via the analog circuit set and the switch set, an input signal of the receiver is generated from a reception signal transmitted via the analog circuit set and the switch set, the reception signal is derived from the transmission signal, and a first delay is calculated after the input signal is received by the receiver.

8. The wireless communication calibration system of claim 7, wherein an internal signal is transmitted inside the radio chipset from the transmitter to the receiver, and a second delay is calculated after the internal signal is received by the receiver.

9. The wireless communication calibration system of claim 8, wherein the switch set bypasses the analog circuit of the analog circuit set to generate a bypassed path, and the reception signal and the output signal are transmitted through the bypassed path.

10. The wireless communication calibration system of claim 9, wherein an outside chipset delay is obtained according to the first delay and the second delay.

11. A wireless communication calibration method, comprising:

receiving an output signal of a transmitter in a radio chipset;

generating a transmission signal external to the radio chipset according to the output signal; and guiding an input signal to a receiver in the radio chipset via a calibration path external to the radio chipset, wherein the input signal is derived from the transmission signal;

wherein a first delay is calculated after the input signal is received by the receiver.

12. The wireless communication calibration method of claim 11, further comprising:

transmitting an internal signal inside the radio chipset from the transmitter to the receiver; and calculating a second delay after the internal signal is received by the receiver.

13. The wireless communication calibration method of claim 12, further comprising:

obtaining an outside chipset delay according to the first delay and the second delay.

14. The wireless communication calibration method of claim 11, wherein generating the transmission signal comprises utilizing an analog circuit set to generate the transmission signal according to the output signal; and the calibration method further comprises:

utilizing a switch set, external to the radio chipset, to selectively bypass at least one analog circuit of the analog circuit set;

wherein the output signal of the transmitter is transmitted via the switch set and the analog circuit set.

15. The wireless communication calibration method of claim 14, wherein the switch set bypasses the analog circuit of the analog circuit set to generate a bypassed path, and the output signal is transmitted through the bypassed path.

16. The wireless communication calibration method of claim 11, wherein the calibration path comprises a coupler or an antenna.

17. A wireless communication calibration method, comprising:

generating a transmission signal from an output signal of a transmitter that is transmitted via an analog circuit set and a switch set;

generating an input signal of a receiver from a reception signal transmitted via the analog circuit set and the switch set, wherein the reception signal is derived from the transmission signal, wherein the transmitter and the receiver are in a radio chipset, and the switch set and the analog circuit set are external to the radio chipset; and utilizing the switch set to selectively bypass at least one analog circuit of the analog circuit set;

wherein a first delay is calculated after the input signal is received by the receiver.

18. The wireless communication calibration method of claim 17, further comprising:

transmitting a second signal inside the radio chipset from the transmitter to the receiver; and calculating a second delay after the second signal is received by the receiver.

19. The wireless communication calibration method of claim 18, wherein utilizing the switch set to selectively bypass the analog circuit of the analog circuit set comprises:

bypassing the analog circuit of the analog circuit set to generate a bypassed path, and transmitting the reception signal and the output signal through the bypassed path.

20. The wireless communication calibration method of claim 19, further comprising:

obtaining an outside chipset delay according to the first delay and the second delay.

* * * * *